Patented Sept. 7, 1937

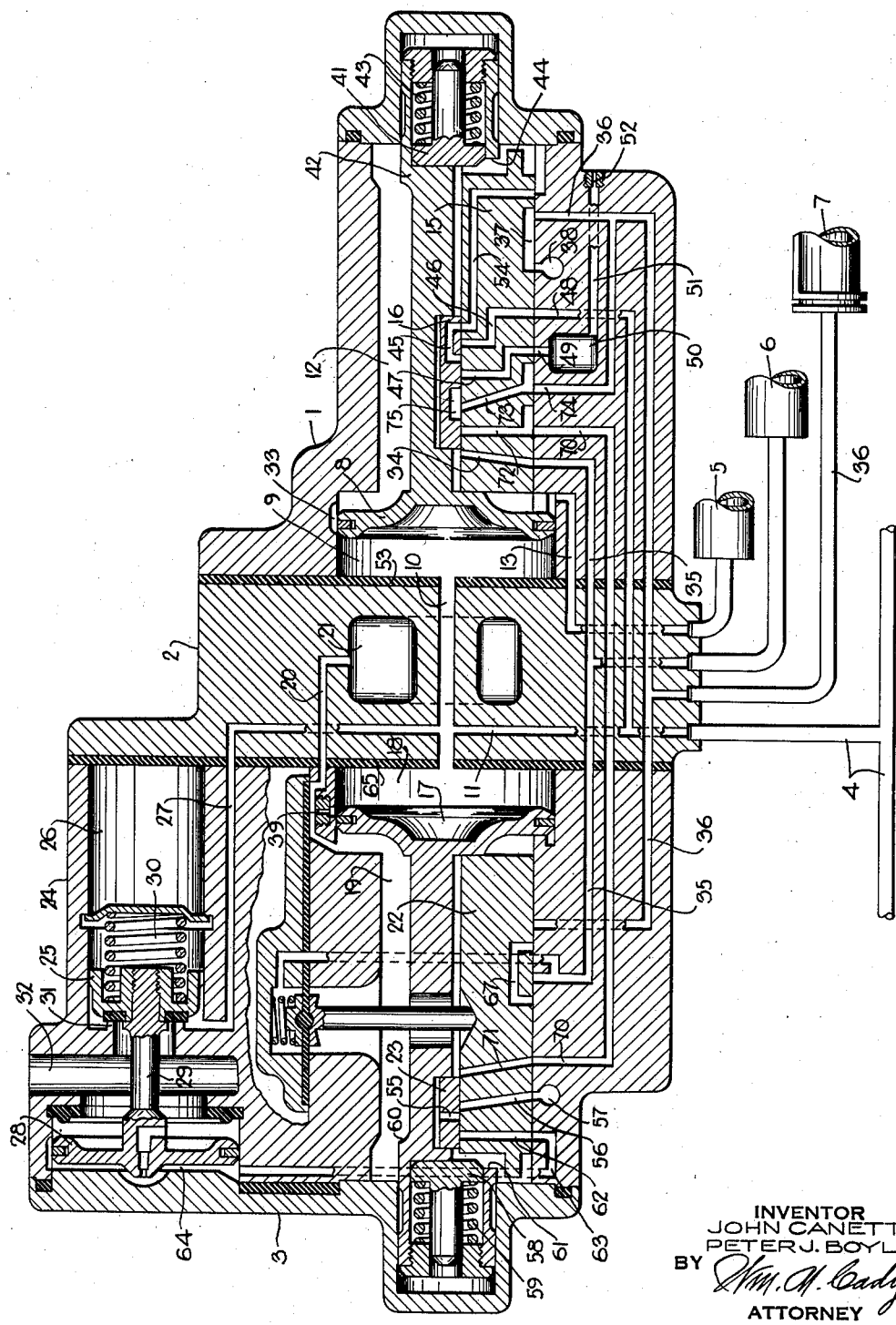

2,092,369

UNITED STATES PATENT OFFICE 2,092,369

FLUID PRESSURE BRAKE

John Canetta, Wilkinsburg, and Peter J. Boyle, Wilmerding, Pa., assignors to The Westinghouse Air Brake Company, Wilmerding, Pa., a corporation of Pennsylvania Application July 16, 1936, Serial No. 90,900

25 Claims. (Cl. 303—42)

This invention relates to fluid pressure brakes and more particularly to the type adapted to operate upon a reduction in brake pipe pressure to effect an application of the brakes and upon an increase in brake pipe pressure to effect a release of the brakes.

In Patent No. 2,031,213 issued to Clyde C. Farmer on February 18, 1936, there is disclosed a brake controlling valve device comprising a service portion which is adapted to operate upon a service reduction in brake pipe pressure to effect a service application of the brakes and an emergency portion which is adapted to operate along with the service portion upon an emergency reduction in brake pipe pressure to effect an emergency application of the brakes.

Both the service and emergency portions of this brake controlling valve device comprise a piston, and a main slide valve and an auxiliary slide valve adapted to be operated by the piston. In the service portion the piston is subject to the opposing pressures of the brake pipe and auxiliary reservoir and upon a service or emergency reduction in brake pipe pressure makes its full traverse, that is, from a release position to a service position in which fluid under pressure is supplied from the usual auxiliary reservoir to the brake cylinder. In the emergency portion the piston is controlled by the opposing pressures of the brake pipe and a quick action chamber and is adapted to operate upon a service reduction in brake pipe pressure to move the auxiliary slide valve to a service position in which a communication is established between the quick action chamber and atmosphere through which the pressure of fluid in the quick action chamber is adapted to be reduced at the same rate as the brake pipe pressure is reduced. This communication is however restricted to such a degree that the pressure of fluid in the quick action chamber can not reduce as fast as the brake pipe pressure reduces upon an emergency rate of reduction in which case a sufficient differential of pressures is promptly provided on the emergency piston to operate said piston to move the slide valves controlled thereby through the service position to an emergency position for effecting an emergency application of the brakes.

It has been found that the static resistance to movement of the emergency piston from its normal position occasionally becomes increased to a degree greater than intended one, it is believed, in some instances, to slight accumulations of foreign matter around the piston on the cylinder wall. This is undesirable for it requires a greater than normal differential of fluid pressures on the emergency piston to start said piston moving, and if this differential becomes sufficiently great before the piston starts to move the rapidity of movement of the piston after it starts to move and its inertia are liable to cause said piston to move the auxiliary slide valve controlled thereby through the service position thereof so quickly that no appreciable reduction in quick action chamber pressure can be effected to reduce the differential of pressures on the piston to stop same, in which case said piston is liable to move on to the emergency position and thereby initiate an emergency application of the brakes upon a service reduction in brake pipe pressure.

It is undesirable to have an emergency application of the brakes occur upon a service reduction in brake pipe pressure because it means that a train will be stopped and thereby interfere with its operating schedule, and further, there is a possibility of damage to cars in a train or the lading carried thereby in case of an emergency application of the brakes, and one object of the invention is to provide improved means for preventing such undesired operation.

In the service portion of the brake equipment above referred to, the static resistance to movement of the piston does not vary to any appreciable degree and this is attributed to the fact that full traverse thereof is effected upon every application of the brakes, whereas in the emergency portion the piston travel upon a service reduction in brake pipe pressure is limited to a very small degree, such as one sixteenth of an inch, and this may tend to cause foreign matter to bind the emergency piston in its cylinder. The fact, however, that the service piston always remains operable by substantially the differential of pressures intended, which is less than required on the emergency piston to cause undesired emergency operation thereof upon a service reduction in brake pipe pressure, is taken advantage of and according to another feature of the invention a communication is provided from the quick action chamber to the service portion of the equipment through which, in case the emergency piston and auxiliary slide valve controlled thereby fail to operate as intended upon a service reduction in brake pipe pressure, fluid under pressure is vented from the quick action chamber upon the preliminary movement of the service piston and its auxiliary slide valve from their normal position, this venting occurring at such a rate with respect to the service reduction in brake pipe pressure as to prevent obtaining sufficient differential of pressures on the emergency piston to move same to emergency position.

Undesired emergency operation of the emergency valve device as above described is of rare occurrence and even if the service portion of the equipment was subject to such variations in static friction as the emergency portion it is improbable that both portions would ever be in the same high static frictional condition at the same time, due to which, the provision of means in the service portion for venting the quick action chamber upon a service reduction in brake pipe pressure in combination with the usual means in the emergency portion for effecting such venting would provide substantially complete protection against undesired emergency operation of the emergency portion upon a service reduction in brake pipe pressure.

Other objects and advantages will be apparent from the following more detailed description of the invention.

In the accompanying drawing, the single figure is a diagrammatic view of a fluid pressure brake equipment embodying the invention.

The fluid pressure brake equipment shown in the drawing is very similar to that disclosed in the aforementioned patent but only those parts are shown which are deemed essential to a comprehensive understanding of the invention, and the following description of parts and operation will likewise be limited.

As shown in the drawing, the fluid pressure brake equipment comprises a service portion or valve device 1 mounted on one face of a pipe bracket 2 and an emergency portion or valve device 3 mounted on another face of said pipe bracket. Connected to the pipe bracket 2 is a brake pipe 4, an auxiliary reservoir 5, an emergency reservoir 6 and a brake cylinder 7.

The service portion 1 comprises a piston 8 having at one side a piston chamber 9 connected through passages 10 and 11 to brake pipe 4 and at the opposite side a valve chamber 12 connected to a passage 13 which communicates with the auxiliary reservoir 14. A main slide valve 15 and an auxiliary slide valve 16 are disposed in valve chamber 12 and are adapted to be operated by the piston 8.

The emergency portion 3 comprises an emergency piston 17 having at one side a chamber 18 connected to the brake pipe 4 through passages 10 and 11 and having at the opposite side a valve chamber 19 connected to a passage 20 which leads to a quick action chamber 21, said valve chamber containing a main slide valve 22 and an auxiliary slide valve 23 adapted to be operated by the emergency piston 17.

A brake pipe vent valve device 24 is preferably associated with the emergency valve device 3 and comprises a valve 25 contained in a chamber 26 which is connected through a passage 27 and passages 10 and 11 to brake pipe 4, and a piston 28 connected to said valve by a stem 29. A spring 30 is provided in chamber 26 and acts on the valve 25 normally seating said valve against a seat rib 31 thereby closing communication from the brake pipe chamber 26 to a chamber 32 which is open to the atmosphere.

In operation, in order to initially charge the fluid pressure brake equipment fluid under pressure is supplied to brake pipe 4 in the usual well known manner and from thence flows through passages 11 and 10 to piston chambers 9 and 18 and from passage 10 through passage 27 to the vent valve chamber 26.

With the service piston 8 and slide valves 15 and 16 in their normal position, as shown in the drawing, fluid under pressure supplied to chamber 9 flows through a feed groove 33 to valve chamber 12 and from thence through passage 13 to the auxiliary reservoir 5 and also from said chamber through a port 34 in the main slide valve 15 to a passage 35 which communicates with the emergency reservoir 6, so that said valve chamber and reservoirs become charged to fluid at the pressure carried in brake pipe 4.

With the slide valve 15 in the normal or release position the brake cylinder 7 is vented to the atmosphere through pipe and passage 36, cavity 37 in said slide valve and an atmospheric passage 38.

Fluid under pressure supplied from the brake pipe 4 to the emergency piston chamber 18 flows through a restricted charging port 39 to a passage 20 and from thence in one direction to the emergency valve chamber 19 and in the opposite direction to the quick action chamber 21 thereby charging said chambers with fluid at the pressure in the brake pipe 4.

If it is desired to effect a service application of the brakes a service rate of reduction in pressure is effected in brake pipe 4 and consequently in the service piston chamber 9 and emergency piston chamber 18.

When the brake pipe pressure in piston chamber 9 is thus reduced sufficiently, such as four-tenths of a pound, below the opposing auxiliary reservoir pressure in valve chamber 12, the differential of pressures moves the service piston 8 and thereby the auxiliary slide valve 16 towards the left hand to close the feed groove 33 to prevent back flow of fluid under pressure from the auxiliary reservoir to the brake pipe. At substantially the same time as the feed groove 33 is closed, a plunger 41 which is carried in the end of piston stem 42 and which is subject to the pressure of a spring 43, engages the right hand end of the main slide valve 15 to oppose further movement of said piston towards the left hand until the differential of pressures is increased on said piston sufficiently, such as five-tenths of a pound, to compress said spring. When the differential of pressures is thus increased upon a continuance of the reduction in brake pipe pressure, the piston 8 moves the auxiliary slide valve 16 further towards the left hand until shoulder 44 at the right hand end of the piston stem 42 engages the end of the main slide valve 15. In this position of the auxiliary slide valve 16, which is termed preliminary quick service position, a cavity 45 in the auxiliary slide valve establishes a communication between ports 46 and 47 in the main slide valve 15. In the normal position of the main slide valve, as shown in the drawing, port 46 registers with a passage 48 which leads to the brake pipe passage 11 while port 47 registers with a passage 49 which leads to a quick service reservoir 50 which is normally vented to the atmosphere through a passage 51 and a restricted port 52. When the auxiliary slide valve 16 therefore is moved to this preliminary quick service position fluid under pressure is rapidly vented from brake pipe 4 into the quick service reservoir 50 which produces a rapid but limited local quick service reduction in brake pipe pressure for transmitting quick service action serially through a train and for providing in piston chamber 9 sufficient reduction in brake pipe pressure to operate the piston 8 to move the main slide valve 15 to service position which is defined by engagement of said piston with a gasket 53.

In case the reduction in brake pipe pressure produced by substantial equalization thereof into the quick service reservoir 50 does not produce sufficient differential of pressures on the service piston 8 to move said piston to service position such reduction will continue through the restricted port 52 to the atmosphere until sufficient differential is obtained on said piston to move same to service position.

In service position of the main slide valve 15 the emergency reservoir charging passage 35 is lapped thereby to prevent back flow of fluid under pressure from the emergency reservoir 6 to valve chamber 12 and from thence to the auxiliary reservoir 5. The quick service passages 47 and 49 are also lapped to prevent a continuance of quick service venting of fluid under pressure from the brake pipe to the quick service reservoir 50 and from thence to the atmosphere through port 52, and a service port 54 registers with the brake cylinder passage 36.

Fluid under pressure then flows from valve chamber 12, and hence the auxiliary reservoir 5, through the service port 54 to passage 36 and from thence to the brake cylinder 7 to effect a service application of the brakes.

If the reduction in brake pipe pressure is less than a full service reduction, then when the auxiliary reservoir pressure acting in chamber 12 becomes reduced to a degree slightly lower than the brake pipe pressure acting in chamber 9, the piston 8 and thereby the auxiliary slide valve 16 are moved towards the right hand to lap position defined by engagement of said piston with the left hand end of the main slide valve 15. In this position the service port 54 is lapped by the auxiliary slide valve 16 so as to prevent further flow of fluid under pressure to the brake cylinder 7. If it is desired to increase the degree of application of the brakes a further reduction in brake pipe pressure is effected and a corresponding reduction in auxiliary reservoir pressure occurs with a corresponding increase in brake cylinder pressure.

If a full service reduction in brake pipe pressure is effected, then the pressure of fluid in the auxiliary reservoir 5 is permitted to reduce to equalization into the brake cylinder 7 in which case the auxiliary reservoir pressure can not reduce below the pressure of fluid in the brake pipe and as a consequence the piston 8 and auxiliary slide valve 16 remain in the service position.

If the emergency valve device is in condition to operate as intended upon a service reduction in brake pipe pressure, that is, if the static resistance to movement of the emergency piston 17 is not excessive, then when the brake pipe pressure in chamber 18 is reduced slightly below the pressure in valve chamber 19, such as four-tenths of a pound, the differential of pressures acting on piston 17 moves said piston and thereby the auxiliary slide valve 23 towards the right hand causing a service port 55 in the auxiliary slide valve 23 to register with a port 56 in the main slide valve 22 which in turn registers with an atmospheric passage 57 in the seat of the main slide valve 22. Through the communication thus established, the pressure of fluid in the valve chamber 19 and connected quick action chamber 21 is adapted to reduce to the atmosphere at substantially the same rate as the service rate of reduction in brake pipe pressure in piston chamber 18. This prevents the differential of pressures increasing on the emergency piston 17 beyond that required to move said piston to service position so that said piston will not move the auxiliary valve 23 past the service position upon a service reduction in brake pipe pressure.

When upon a service reduction in brake pipe pressure the pressure in the valve chamber 19 is reduced sufficiently, brake pipe pressure acting on piston 17 shifts said piston and the auxiliary slide valve 23 back towards the normal position and laps the service port 56 so as to prevent further reduction in pressure in said chamber. Upon a further reduction in brake pipe pressure the piston 17 again operates the auxiliary slide valve 23 to effect a corresponding reduction in pressure in the quick action chamber and thus acts to maintain the pressure in the emergency valve chamber 19 and quick action chamber 21 substantially equal to brake pipe pressure at all times, for reasons which will hereinafter be more fully described.

A plunger 58 subject to the pressure of a spring 59 is provided in the end of the emergency piston stem 60 and is adapted to engage the end of the main slide valve 22 at about the time the service port 55 moves into full registry with port 56. The spring 59 then acts to oppose further movement of the emergency piston 17 and auxiliary slide valve with a force which requires an increase in the differential of fluid pressures on the piston 17, due to which said spring acts to stabilize said piston against undesired movement past service position upon a service reduction in brake pipe pressure.

When an emergency rate of reduction in brake pipe pressure is effected, the service portion 1 of the brake equipment operates in the same manner as in effecting a service application of the brakes. In the emergency portion of the equipment however, the venting capacity of service ports 55 and 56, when in registry in service position of the auxiliary slide valve 23, is insufficient to reduce the pressure in valve chamber 19 and quick action chamber 21 at as fast a rate as the rate of reduction in brake pipe pressure in piston chamber 18, so that the differential of pressures on the emergency piston 17 will increase to a degree sufficient to overcome the opposing pressure of spring 59 acting on the stop 58. The emergency piston 17 then moves the auxiliary slide valve 23 past service position, above described, to an emergency position defined by the engagement of a shoulder 61 on the piston stem 60 with the left hand end of the main slide valve 22.

In this emergency position an emergency port 62 in the main slide valve 22 is uncovered by the auxiliary slide valve 23 and thus opened to valve chamber 19. Fluid under pressure then flows from valve chamber 19 and the connected quick action chamber 21 through said port to a passage 63 in the slide valve seat and through said passage to chamber 64 at the left hand face of the vent valve piston 28.

Fluid under pressure thus supplied to chamber 64 acts on piston 28 and moves said piston towards the right hand and unseats the vent valve 25 which permits fluid under pressure to rapidly vent from the brake pipe 4 through passages 11, 10, 27, chamber 26, past said vent valve to chamber 32 and from thence to the atmosphere. The resultant sudden reduction in brake pipe pressure acts to cause emergency operation of the brake equipment on the next adjacent car in the train for propagating serially quick action through the train and also acts in the emergency piston chamber 18 to suddenly increase the differential of pressures on the emergency piston 17 to a degree sufficient to cause said piston to move the main slide valve 22 to its emergency position as defined by the engagement of said piston with a gasket 65. In this position of the main slide valve 22 passage 63 is uncovered thereby and opened directly to the valve chamber 19 so that fluid under pressure continues to be supplied to the vent valve piston chamber 64 for maintaining the vent valve 25 open sufficiently long to ensure complete venting of fluid under pressure from brake pipe 4.

In emergency position of the main slide valve 22 a cavity 67 therein connects passage 35, which leads to the emergency reservoir 6, to passage 36 which leads to the brake cylinder and through this communication fluid under pressure in the emergency reservoir 6 is permitted to equalize into the brake cylinder 7 along with that from the auxiliary reservoir 5 supplied through operation of the service portion 1 of the equipment, and thereby produce high emergency pressure in the brake cylinder 7.

Since in effecting a service application of the brakes the emergency valve device 3 is adapted to operate to maintain the pressure in the emergency valve chamber 19 and quick action chamber 21 substantially equal to the pressure in the brake pipe, said device is intended to be conditioned at all times to respond to an emergency reduction in brake pipe pressure for propagating emergency action through a train and for producing high brake cylinder pressure as above described, even if such emergency reduction in brake pipe pressure is initiated after a partial or full service application of the brakes is effected.

If in effecting a service application of the brakes the emergency piston 17 does not respond to the service reduction in brake pipe pressure in the manner hereinbefore described, due to foreign matter or the like producing excessive static friction between said piston and its cylinder wall, it will be evident that the differential of pressures on said piston might increase as the brake pipe pressure continued to be reduced until eventually said piston broke loose and started moving. If this differential should be sufficient at the time the emergency piston started to move, said piston might move so rapidly through service position that the registration of service ports 55 and 56 would not produce any appreciable reduction in pressure in valve chamber 19 and as a consequence said piston would then tend to move the auxiliary slide valve 23 on to emergency position and thereby initiate an emergency application of the brakes on the train upon a service reduction in brake pipe pressure.

In order to avoid an emergency application of the brakes being effected upon a service reduction in brake pipe pressure, as just described, the dependable operation of the service portion 1 of the brake equipment upon a service reduction in brake pipe pressure by a differential of pressures less than required on the emergency piston 17 to effect undesired emergency operation thereof, is taken advantage of to reduce the pressure in the emergency valve chamber 19 and quick action chamber 21 at a service rate upon failure of the emergency valve portion 3 to operate as intended.

According to the invention a passage 70 is provided connected at one end to the seat of the emergency main slide valve 22 and at the opposite end to the seat of the service main slide valve 15. A port 71 is provided through the emergency main slide valve 22 adapted in the normal position thereof to register with passage 70 and to be open to valve chamber 19 past the right hand end of the emergency auxiliary slide valve 23 when it is in its normal position.

In the service portion of the equipment two spaced ports 72 and 73 are provided through the main slide valve 15 and are adapted in all positions thereof to register respectively with passages 70 and 74 which open at the seat of said slide valve, the passage 74 leading to the brake cylinder passage 36.

The ports 72 and 73 open at the seat of the auxiliary slide valve 16 and are normally lapped thereby. A cavity 75 is provided in the auxiliary slide valve 16 adapted to establish communication from passage 72 to passage 73 in the preliminary quick service position of said slide valve.

In operation, if the emergency portion 3 responds as intended to a service reduction in brake pipe pressure, the movement of the auxiliary slide valve 23 to service position laps the port 71 in the main slide valve 22 and the service venting of fluid under pressure from the valve chamber 19 and quick action chamber 21 occurs through ports 55 and 56 in the same manner as hereinbefore described.

If, however, the emergency portion 3 is not operated by the differential of pressures intended upon a service reduction in brake pipe pressure, the movement of the service portion 1 to the quick service position establishes a vent communication from the emergency valve chamber 19 and quick action chamber 21 to the brake cylinder 7 through port 71, passage 70, port 73 in the service slide valve 15, cavity 75 in auxiliary slide valve 16, port 73 in slide valve 15 and passages 74 and 36. Through this communication the pressure of fluid in the emergency valve chamber 19 and quick action chamber 21 is adapted to reduce by flow to the brake cylinder 7 at substantially the same rate as the brake pipe pressure is reduced upon a service reduction, so that a differential of pressures can not build up on the emergency piston 17 such as required to effect movement of said piston to emergency position.

When the service portion 1 moves to lap position, in case less than a full service reduction in brake pipe pressure is effected, ports 72 and 73 are disconnected so that the pressure in the emergency valve chamber 19 and quick action chamber 21 can not continue to reduce into the brake cylinder 7 while the brakes are lapped and thus possibly become lower than brake pipe pressure.

If a full service reduction in brake pipe pressure is effected, in which case the service valve device remains in service position, the vent communication above described is maintained open, but in this case the brake pipe pressure and that in the auxiliary reservoir 5 and brake cylinder 7 are all equalized so that the pressure in the emergency valve chamber 19 and quick action chamber 21 can not reduce below brake pipe pressure. This is very desirable in that it maintains the opposing pressures acting on the emergency piston 17 substantially equalized at all times whether after a partial or full service application of the brakes, so that the emergency portion is always in condition to respond to a sudden reduction in brake pipe pressure for propagating emergency action through a train and for producing an emergency application of the brakes, the same as if the emergency portion 3 operates as intended upon or service reduction in brake pipe pressure.

It will be evident that the vent communication above described need be connected to the brake cylinder only to limit the reduction in pressure in the emergency valve chamber 19 and quick action chamber 21 in case of a full service reduction in brake pipe pressure, since for all degrees of reduction in brake pipe pressure less than a full service reduction the operation of the auxiliary slide valve 16 in the service portion closes the vent communication and thereby limits the reduction in pressure in said chambers in the same manner as such reduction is limited by the operation of the auxiliary slide valve 23 in the emergency portion 3 when said emergency portion operates as intended.

It will now be evident that if the emergency portion 3 fails to properly respond to a service reduction in brake pipe pressure to effect a corresponding reduction in pressure in the emergency valve chamber 19 and quick action chamber 21 so as to avoid possible operation thereof to effect an undesired emergency application of the brakes, the operation of the service portion 1 upon a service reduction in brake pipe pressure will effect such reduction in pressure in said chamber and thus prevent the differential of pressures from increasing on the emergency piston 17 to a degree such as to cause said undesired operation.

It will be further noted that although there are two means provided for venting fluid under pressure from the emergency valve chamber 19 and quick action chamber 21 upon a service reduction in brake pipe pressure only one of the means is effective, that is, if the emergency portion 3 operates as intended the vent is by way of the service ports 55 and 56 and the vent through passage 70 is closed by the auxiliary slide valve 21, while if the emergency portion fails to operate as intended the vent is by way of the passage 70 while the service vent ports 55 and 56 are closed. This ensures that adequate differential of pressures will be obtained on the emergency piston 17 upon an emergency reduction in brake pipe pressure to effect emergency operation thereof the same as if the added vent through passage 70 were not employed.

It will be further evident that the service portion of the equipment will produce the same result as to reducing of the pressure of fluid in the emergency valve chamber 19 and quick action chamber 21 upon a service reduction in brake pipe pressure as if such reduction were controlled by the operation of the emergency piston 17 and auxiliary slide valve 23, so that the emergency portion 3 is always in condition to operate upon an emergency reduction in brake pipe pressure to effect an emergency application of the brakes.

While one illustrative embodiment of our invention has been described in detail, it is not our intention to limit its scope to this embodiment or otherwise than by the terms of the appended claims.

Having now described our invention, what we claim as new and desire to secure by Letters Patent, is:

1. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure and a service valve device controlled by the opposing pressures of said brake pipe and auxiliary reservoir and operative upon a service reduction in brake pipe pressure to effect a service application of the brakes and to reduce the pressure in said quick action chamber at substantially the same rate as the brake pipe pressure is reduced to prevent operation of said emergency valve device upon a service reduction in brake pipe pressure.

2. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure, and a valve device controlled by the opposing pressures of said brake pipe and auxiliary reservoir and responsive to a service rate of reduction in brake pipe pressure to effect a service rate of reduction in pressure in said quick action chamber for preventing operation of said emergency valve device upon a service rate of reduction in brake pipe pressure.

3. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure, and a service valve device controlled by the opposing pressures of said brake pipe and auxiliary reservoir and comprising means responsive to a service rate of reduction in brake pipe pressure for effecting a quick service reduction in brake pipe pressure and other means operative to effect a service rate of reduction in pressure in said quick action chamber for preventing operation of said emergency valve device upon a service rate of reduction in brake pipe pressure.

4. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure, and a service valve device controlled by the opposing pressures of said brake pipe and auxiliary reservoir and comprising means responsive to a service rate of reduction in brake pipe pressure to effect a quick service reduction in brake pipe pressure and other means operative, at the same time as the first mentioned means operates, to effect a service rate of reduction in pressure in said quick action chamber for preventing operation of said emergency valve device upon a service rate of reduction in brake pipe pressure.

5. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure, and a service valve device controlled by the opposing pressures of said brake pipe and auxiliary reservoir and responsive to a service rate of reduction in brake pipe pressure to effect a quick service reduction in brake pipe pressure and a service rate of reduction in pressure in said quick action chamber for preventing operation of said emergency valve device upon a service rate of reduction in brake pipe pressure, said service valve device being also operative upon a service rate of reduction in brake pipe pressure to effect a service application of the brakes.

6. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure, and a service valve device comprising a piston controlled by the opposing pressures of said brake pipe and auxiliary reservoir, and valve means operative by said piston upon a reduction in brake pipe pressure to effect a service application of the brakes and to effect a service rate of reduction in pressure in said quick action chamber for preventing operation of said emergency valve device upon a service rate of reduction in brake pipe pressure.

7. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure, and a service valve device comprising a piston controlled by the opposing pressures of said brake pipe and auxiliary reservoir, a valve movable by said piston upon a reduction in brake pipe pressure to a position for effecting a service rate of reduction in pressure in said quick action chamber to prevent operation of said emergency valve device upon a service rate of reduction in brake pipe pressure, and another valve movable by said piston upon a reduction in brake pipe pressure and cooperative with the first mentioned valve upon said movement thereof to effect a service application of the brakes.

8. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure, and a service valve device comprising a piston controlled by the opposing pressures of said brake pipe and auxiliary reservoir, and valve means operative by said piston upon a reduction in brake pipe pressure to effect a service application of the brakes and to effect a service rate of reduction in pressure in said quick action chamber for preventing operation of said emergency valve device upon a service rate of reduction in brake pipe pressure and means included in said valve means for effecting a quick service venting of fluid under pressure from said brake pipe.

9. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure, and a service valve device comprising a piston controlled by the opposing pressures of said brake pipe and auxiliary reservoir, a valve movable by said piston upon a reduction in brake pipe pressure to a position for effecting a service rate of reduction in pressure in said quick action chamber to prevent operation of said emergency valve device upon a service rate of reduction in brake pipe pressure, and also operative in said position to effect a quick service venting of fluid under pressure from said brake pipe, spring means operative to oppose operation of said piston to move said valve to said position, and another valve movable by said piston upon a reduction in brake pipe pressure and cooperative with the first mentioned valve to effect a service application of the brakes.

10. In a fluid pressure brake, in combination, a brake pipe, a brake cylinder, a quick action chamber normally charged with fluid at brake pipe pressure, an emergency valve device controlled by the opposing pressures of said brake pipe and chamber and operative by the pressure of fluid in said chamber upon an emergency rate of reduction in brake pipe pressure to supply fluid under pressure to said brake cylinder for effecting an emergency application of the brakes, an auxiliary reservoir normally charged with fluid at the pressure in said brake pipe, a service valve device controlled by the opposing pressures of said brake pipe and auxiliary reservoir and operative upon a reduction in brake pipe pressure to supply fluid under pressure from said auxiliary reservoir to said brake cylinder for effecting a service application of the brakes and for venting fluid under pressure from said quick action chamber to said brake cylinder for effecting a service reduction in pressure in said quick action chamber to prevent operation of said emergency valve device upon a service reduction in brake pipe pressure.

11. In a fluid pressure brake, in combination, a brake pipe, a brake cylinder, a quick action chamber normally charged with fluid at brake pipe pressure, an emergency valve device controlled by the opposing pressures of said brake pipe and chamber and operative by the pressure of fluid in said chamber upon an emergency rate of reduction in brake pipe pressure to supply fluid under pressure to said brake cylinder for effecting an emergency application of the brakes, an auxiliary reservoir normally charged with fluid at the pressure in said brake pipe, a service valve device controlled by the opposing pressures of said brake pipe and auxiliary reservoir and operative upon a reduction in brake pipe pressure to establish a communication through which fluid under pressure is supplied from said auxiliary reservoir to said brake cylinder to effect a service application of the brakes and to establish another communication through which fluid under pressure is vented from said quick action chamber to said brake cylinder at a service rate for reducing the pressure in said quick action chamber substantially with brake pipe pressure to prevent operation of said emergency valve device upon a service rate of reduction in brake pipe pressure, said service valve device being operative to close both of said communications when the pressure of fluid in said auxiliary reservoir is reduced by flow to said brake cylinder to a degree slightly less than the reduced brake pipe pressure.

12. In a fluid pressure brake, in combination, a brake pipe, a quick action chamber normally charged with fluid at brake pipe pressure, an emergency valve device controlled by the opposing pressures of said brake pipe and quick action chamber and operative by the pressure of fluid in said quick action chamber upon an emergency rate of reduction in brake pipe pressure to effect an emergency application of the brakes, an auxiliary reservoir normally charged with fluid at brake pipe pressure, and a service valve device controlled by the opposing pressures of said brake pipe and auxiliary reservoir and operative upon a service rate of reduction in brake pipe pressure to supply fluid under pressure from said auxiliary reservoir to effect a service application of the brakes and also operative upon said service rate of reduction in brake pipe pressure to reduce the pressure of fluid in said quick action chamber at substantially the same rate to prevent operation of said emergency valve device upon a service reduction in brake pipe pressure, said service valve device being operative when the pressure of fluid in said auxiliary reservoir is reduced to a degree lower than brake pipe pressure to close the communication through which fluid under pressure is supplied from said auxiliary reservoir to apply the brakes and to also close the communication through which the pressure of fluid in said quick action chamber is reduced.

13. In a fluid pressure brake, in combination, a brake pipe, a brake cylinder, a quick action chamber normally charged with fluid at brake pipe pressure, an emergency valve device controlled by the opposing pressures of said brake pipe and chamber and operative by the pressure of fluid in said chamber upon an emergency rate of reduction in brake pipe pressure to supply fluid under pressure to said brake cylinder for effecting an emergency application of the brakes, an auxiliary reservoir normally charged with fluid at the pressure in said brake pipe, a service valve device comprising a piston subject to the opposing pressures of the brake pipe and auxiliary reservoir, and a main valve and auxiliary valve operative by said piston, said piston being operative upon a reduction in brake pipe pressure to first move said auxiliary valve relative to said main valve for uncovering a service port through said main valve and to then move said main valve to a service position for supplying fluid under pressure from said auxiliary reservoir through said service port to said brake cylinder to effect a service application of the brakes, said piston being operative upon a reduction in auxiliary reservoir pressure below brake pipe pressure to move said auxiliary valve relative to said main valve in the reverse direction to a lap position for lapping said service port through said main valve to cut off the supply of fluid under pressure from said auxiliary reservoir to said brake cylinder, said auxiliary valve also being operative upon the relative movement effected upon a reduction in brake pipe pressure to vent fluid under pressure from said quick action chamber at a service rate and upon the relative movement in the reverse direction to cut off such venting.

14. In a fluid pressure brake, in combination, a brake pipe, a brake cylinder, a quick action chamber normally charged with fluid at brake pipe pressure, an emergency valve device controlled by the opposing pressures of said brake pipe and chamber and operative by the pressure of fluid in said chamber upon an emergency rate of reduction in brake pipe pressure to supply fluid under pressure to said brake cylinder for effecting an emergency application of the brakes, an auxiliary reservoir normally charged with fluid at the pressure in said brake pipe, a service valve device comprising a piston subject to the opposing pressures of the brake pipe and auxiliary reservoir, and a main valve and auxiliary valve operative by said piston, said piston being operative upon a reduction in brake pipe pressure to first move said auxiliary valve relative to said main valve for uncovering a service port through said main valve and to then move said main valve to a service position for supplying fluid under pressure from said auxiliary reservoir through said service port to said brake cylinder to effect a service application of the brakes, said piston being operative upon a reduction in auxiliary reservoir pressure below brake pipe pressure to move said auxiliary valve relative to said main valve in the reverse direction to a lap position for lapping said service port through said main valve to cut off the supply of fluid under pressure from said auxiliary reservoir to said brake cylinder, said auxiliary valve also being operative to control a communication through which the pressure of fluid in said quick action chamber is adapted to be reduced at a service rate and to open said communication when said service port is open and to close said communication when said service port is lapped by said auxiliary valve.

15. In a fluid pressure brake, in combination, a brake pipe, a brake cylinder, a quick action chamber normally charged with fluid at brake pipe pressure, an emergency valve device controlled by the opposing pressures of said brake pipe and chamber and operative by the pressure of fluid in said chamber upon an emergency rate of reduction in brake pipe pressure to supply fluid under pressure to said brake cylinder for effecting an emergency application of the brakes, an auxiliary reservoir normally charged with fluid at the pressure in said brake pipe, a service valve device comprising a piston subject to the opposing pressures of the brake pipe and auxiliary reservoir, and a main valve and auxiliary valve operative by said piston, said piston being operative upon a reduction in brake pipe pressure to first move said auxiliary valve relative to said main valve for uncovering a service port through said main valve and to then move said main valve to a service position for supplying fluid under pressure from said auxiliary reservoir through said service port to said brake cylinder to effect a service application of the brakes, said piston being operative upon a reduction in auxiliary reservoir pressure below brake pipe pressure to move said auxiliary valve relative to said main valve in the reverse direction to a lap position for lapping said service port through said main valve to cut off the supply of fluid under pressure from said auxiliary reservoir to said brake cylinder, said auxiliary valve also being operative to control a communication between said quick action chamber and brake cylinder through which the pressure of fluid in said quick action chamber is adapted to be reduced at a service rate to prevent movement of said emergency valve device upon a service rate of reduction in brake pipe pressure; said auxiliary valve being operative to open said communication when said service port is open and to close said communication when said service port is closed.

16. In a fluid pressure brake, in combination, a brake pipe, a quick action chamber normally charged with fluid at the pressure in said brake pipe and an auxiliary reservoir also normally charged with fluid at the pressure in said brake pipe, an emergency valve device operative by the pressure of fluid in said quick action chamber upon an emergency reduction in brake pipe pressure to effect an emergency application of the brakes, a service valve device operative upon a service reduction in brake pipe pressure by the pressure of fluid in said auxiliary reservoir to effect a service application of the brakes and operative when effecting a service application of the brakes to establish a communication through which the pressure of fluid in said quick action chamber is reduced at substantially the same rate as the brake pipe pressure is reduced, said communication being controlled by said emergency valve device and closed upon movement thereof upon a reduction in brake pipe pressure.

17. In a fluid pressure brake, in combination, a brake pipe, a quick action chamber normally charged with fluid under pressure, an emergency valve device controlled by the opposing pressures of said brake pipe and quick action chamber and movable by a certain differential between said opposing pressures to a service position to vent fluid under pressure from said quick action chamber at a service rate to prevent movement of said emergency valve device past service position upon a service reduction in brake pipe pressure, and movable by a greater differential between said opposing pressures to an emergency position for effecting an emergency application of the brakes, a service valve device operative upon either a service or an emergency reduction in brake pipe pressure to effect an application of the brakes and to vent fluid under pressure from said quick action chamber at a service rate to prevent obtaining said greater differential of pressures if said emergency valve device fails to operate upon a service reduction in brake pipe pressure, operation of said emergency valve device upon a reduction in brake pipe pressure closing communication through which said service portion is operative to vent fluid under pressure from said quick action chamber.

18. In a fluid pressure brake, in combination, a brake pipe, a quick action chamber normally charged with fluid at brake pipe pressure, an emergency valve device controlled by the opposing pressures of said brake pipe and quick action chamber and movable by a certain differential between said opposing pressures to a service position for venting fluid under pressure from said quick action chamber at a service rate to prevent movement of said emergency valve device past service position upon a service reduction in brake pipe pressure and movable by a greater differential between said opposing pressures to an emergency position for effecting an emergency application of the brakes, and auxiliary reservoir normally charged with fluid at brake pipe pressure, a service valve device controlled by the opposing pressures of said brake pipe and auxiliary reservoir movable upon either a service or an emergency reduction in brake pipe pressure to an application position for supplying fluid under pressure from said auxiliary reservoir to effect an application of the brakes, said service valve device being operative upon movement upon a reduction in brake pipe pressure to establish a communication through which fluid under pressure is adapted to be vented from said quick action chamber at a service rate to prevent obtaining said greater differential of pressures in said emergency valve device upon a service reduction in brake pipe pressure, said emergency valve device being operative to close said communication upon movement thereof to said service position.

19. In a fluid pressure brake, in combination, a brake pipe, a brake cylinder, a quick action chamber normally charged with fluid at the pressure in said brake pipe, an emergency valve device controlled by the opposing pressures of said brake pipe and quick action chamber and adapted to move to a service position upon a service rate of reduction in brake pipe pressure to vent fluid under pressure from said quick action chamber at a corresponding rate and adapted to move to an emergency position upon an emergency reduction in brake pipe pressure to supply fluid under pressure to said brake cylinder to effect an emergency application of the brakes, a service valve device movable upon either a service or an emergency reduction in brake pipe pressure to an application position to supply fluid under pressure to said brake cylinder for applying the brakes and operative upon movement out of its normal position to establish a communication from said emergency valve device to said brake cylinder through which fluid under pressure is adapted to be vented from said quick action chamber to said brake cylinder at a rate to reduce quick action chamber pressure substantially with brake pipe pressure upon a service reduction in brake pipe pressure, said emergency valve device normally opening said communication to said quick action chamber and being operative upon movement out of its normal position to disconnect said communication from said quick action chamber.

20. In a fluid pressure brake, in combination, a brake pipe, a brake cylinder, a quick action chamber normally charged with fluid at the pressure in said brake pipe, an emergency valve device controlled by the opposing pressures of said brake pipe and quick action chamber and adapted to move to a service position upon a service rate of reduction in brake pipe pressure to vent fluid under pressure from said quick action chamber at a corresponding rate and adapted to move to an emergency position upon an emergency reduction in brake pipe pressure to supply fluid under pressure to said brake cylinder to effect an emergency application of the brakes, a service valve device having a normal position and movable therefrom upon a reduction in brake pipe pressure to a quick service position for effecting a quick service reduction in brake pipe pressure and being movable further upon a further reduction in brake pipe pressure to an application position for supplying fluid under pressure to said brake cylinder to apply the brakes, said service valve device in quick service position establishing communication through which fluid under pressure is adapted to be vented from said quick action chamber to said brake cylinder at a service rate in case said emergency valve device fails to respond to a service reduction in brake pipe pressure, said emergency valve device being operative upon response to a service reduction in brake pipe pressure to close said communication.

21. In a fluid pressure brake, in combination, a brake pipe, an emergency valve device subject to the opposing pressures of the brake pipe and a quick action chamber and operative upon a reduction in brake pipe pressure at an emergency rate for effecting an emergency application of the brakes, and a service valve device operative upon a reduction in brake pipe pressure for effecting a service application of the brakes and also operative upon movement to effect a service application of the brakes for venting fluid from the quick action chamber.

22. In a fluid pressure brake, in combination, a brake pipe, an emergency valve device subject to the opposing pressures of the brake pipe and a quick action chamber and operative upon a reduction in brake pipe pressure at an emergency rate for effecting an emergency application of the brakes, and operative upon a reduction in brake pipe pressure at a service rate for venting fluid from the quick action chamber, and a service valve device operative upon a reduction in brake pipe pressure for effecting a service application of the brakes and also operative upon movement to effect a service application of the brakes in the event of failure of the emergency valve device to move upon a service rate of reduction in brake pipe pressure to effect a venting of fluid under pressure from the quick action chamber.

23. In a fluid pressure brake, in combination, a brake pipe, an emergency valve device subject to the opposing pressures of the brake pipe and a quick action chamber and operative upon a reduction in brake pipe pressure at a service rate to vent fluid under pressure from the quick action chamber and upon a reduction in brake pipe pressure at an emergency rate for effecting an emergency application of the brakes, and a service valve device operative upon a reduction in brake pipe pressure for effecting a service application of the brakes and also operative upon failure of the emergency valve device to operate upon a service rate of reduction in brake pipe pressure to then vent fluid under pressure from the quick action chamber at a service rate.

24. In a fluid pressure brake, in combination, a brake pipe, an emergency valve device comprising a piston subject to the opposing pressures of the brake pipe and a quick action chamber, a main valve, and an auxiliary valve movable by said piston relatively to the main valve upon a reduction in brake pipe pressure for venting fluid under pressure from the quick action chamber, and a service valve device comprising a piston, a main valve, and an auxiliary valve movable by said piston relatively to said main valve upon a reduction in brake pipe pressure for also venting fluid under pressure from the quick action chamber, communication through which said service auxiliary valve operates to vent fluid from the quick action chamber being cut off in the event that the emergency auxiliary valve is moved by the emergency piston to effect the venting of fluid from the quick action chamber.

25. In a fluid pressure brake, in combination, a brake pipe, an emergency valve device comprising a piston subject to the opposing pressures of the brake pipe and a quick action chamber, a main valve, and an auxiliary valve movable by said piston relatively to the main valve upon a reduction in brake pipe pressure for venting fluid under pressure from the quick action chamber, and a service valve device comprising a piston, a main valve, and an auxiliary valve movable by said piston relatively to said main valve upon a reduction in brake pipe pressure for also venting fluid under pressure from the quick action chamber through a communication controlled by the emergency auxiliary valve.

JOHN CANETTA.
PETER J. BOYLE.